(12) United States Patent
Cote et al.

(10) Patent No.: US 8,640,617 B2
(45) Date of Patent: Feb. 4, 2014

(54) MULTI-DRIVE PRINTED PRODUCT PROCESSING DEVICE WITH VERIFIED FEEDBACK CONTROL

(75) Inventors: Kevin Lauren Cote, Allen, TX (US); Lothar John Schroeder, Beavercreek, OH (US)

(73) Assignee: Goss International Americas, Inc., Durham, NH (US)

( * ) Notice: Subject to any disclaimer, the term of this patent is extended or adjusted under 35 U.S.C. 154(b) by 363 days.

(21) Appl. No.: 12/587,443

(22) Filed: Oct. 7, 2009

(65) Prior Publication Data
US 2011/0079157 A1 Apr. 7, 2011

(51) Int. Cl.
- B41F 1/34 (2006.01)
- B41L 5/16 (2006.01)
- B41L 15/14 (2006.01)
- B41L 49/00 (2006.01)
- G05B 19/29 (2006.01)
- H02P 7/00 (2006.01)

(52) U.S. Cl.
USPC .......................................... 101/480; 318/611

(58) Field of Classification Search
USPC .......... 101/216, 480, 483, 484, 485; 318/602, 318/603, 611
See application file for complete search history.

(56) References Cited

U.S. PATENT DOCUMENTS

| | | | | |
|---|---|---|---|---|
| 4,215,300 A | * | 7/1980 | Schmidt | 318/603 |
| 4,271,379 A | | 6/1981 | Eckelmeyer | |
| 5,894,802 A | | 4/1999 | Jackson | |
| 6,601,505 B2 | * | 8/2003 | Tokiwa | 101/218 |
| 6,679,172 B2 | | 1/2004 | Tokiwa | 101/484 |
| 6,822,415 B1 | * | 11/2004 | Komiya et al. | 318/629 |
| 6,844,693 B2 | * | 1/2005 | Tazawa et al. | 318/561 |
| 6,949,905 B2 | * | 9/2005 | Tomatsuri et al. | 318/567 |
| 6,955,733 B2 | * | 10/2005 | Miller et al. | 156/64 |
| 7,187,142 B2 | * | 3/2007 | Rehm | 318/400.04 |
| 7,417,392 B2 | * | 8/2008 | Wirtz et al. | 318/432 |
| 7,456,599 B2 | * | 11/2008 | Piefer et al. | 318/625 |
| 7,960,963 B1 | * | 6/2011 | Zarr | 323/322 |
| 2006/0267529 A1 | | 11/2006 | Piefer et al. | |
| 2007/0013334 A1 | | 1/2007 | Wirtz et al. | |
| 2007/0181018 A1 | | 8/2007 | Colin et al. | |

\* cited by examiner

*Primary Examiner* — Daniel J Colilla
*Assistant Examiner* — Leo T Hinze
(74) *Attorney, Agent, or Firm* — Davidson, Davidson & Kappel, LLC

(57) ABSTRACT

A multi-drive printed product processing device is provided that includes a processing component and a motor driving the processing component. A motor control controls the motor. An encoder measures a position of the motor and sends an encoder feedback signal indicating the position. The motor control receives the encoder feedback signal. An encoder feedback signal verification circuit verifies the integrity of the feedback signal.

9 Claims, 3 Drawing Sheets

MULTI-DRIVE PRINTED PRODUCT PROCESSING DEVICE WITH VERIFIED FEEDBACK CONTROL

The present invention relates generally to multi-drive graphic systems and more specifically the use of encoder feedback to monitor the positioning of motors.

BACKGROUND OF INVENTION

U.S. Pat. No. 4,271,379 discloses a web fed press with two press units, each including a driving means driven by a motor. Each motor has an encoder that produces pulse trains corresponding to the positioning of the motor. These pulse trains are compared by a phase comparator, producing a voltage that passes through a filter amplifier and is level shifted by a level shifting circuit, which outputs a signal that represents the speed error between the motors. The signal then passes through a proportional amplifier, an integrator amplifier, two summing input resistors and a summing amplifier, to a regenerative drive circuit. If the relationship between the speed of the motors is not as desired, the energization of the second motor is corrected by the regenerative drive circuit to achieve the proper speed relationship.

U.S. Pat. No. 5,894,802 discloses a method and apparatus for providing disturbance-free speed and position reference signals to drive shafts in a printing press. An isolated position reference unit receives a signal indicating the desired speed of a printing web and generates isolated position reference signals. The position reference signals and are then sent to speed controllers that control the speed of the drive shafts accordingly. Position encoders determine the position of the drive shaft. Regulators then correct the isolated position reference signal based on the determined drive shaft position.

U.S. Pat. Pub. 2006/0267529 discloses an apparatus for use with an encoder feedback device including a comparator, a counter, and a prediction unit. An encoder includes a scanner and determines the position of a rotating load by identifying radially displaced optical markings disposed about the periphery of a disk that is coupled to and rotates with the load. The encoder then sends sine/cosine signals indicating the position of the load to the comparator, which converts the signals into square waves. The counter then counts the rising and falling edges of the square wave signals and stores a position value that represents the position of the load at a certain time. The prediction unit then receives the position value from the counter at a certain time and predicts the position of the rotating load at that time as a function of at least a subset of the position values generated prior to that time and a misalignment between that time and a predetermined update interval to generate an aligned position signal.

U.S. Pat. Pub. 2007/0013334 discloses an electronic line shaft system with master controller that includes a predictor for anticipating a position value of an encoder at a fixed future time. The encoder measures the position of the master line shaft and sends a position signal to the master controller. The master controller, after receiving a command signal from a virtual encoder, then sends a position signal to the predictor, which anticipates the position value of the encoder at a fixed future time. This predicted position value is sent to servant motor drives that hold the predicted position value until a strobe signal sent by the predictor causes each of the servant motor drives to accept the predicted position value and to control their motor systems accordingly. This allows the line shafts driven by the motors to synchronize their positioning.

BRIEF SUMMARY OF THE INVENTION

The present invention provides a multi-drive printed product processing device including a processing component and a motor driving the processing component. A motor control controls the motor. An encoder measures a position of the motor and sends an encoder feedback signal indicating the position. The motor control receives the encoder feedback signal. An encoder feedback signal verification circuit verifies the integrity of the feedback signal.

The present invention also provides a printing press including a first printing unit, which includes a first plate cylinder and a first blanket cylinder. A first motor drives the first printing unit and a first motor control controls the first motor. A first encoder measures a first position of the first motor and sends a first encoder feedback signal indicating the first position of the first motor. A first encoder feedback signal verification circuit verifies the integrity of the first feedback signal. A second printing unit includes a second plate cylinder and a second blanket cylinder. A second motor drives the second printing unit and a second motor control controls the second motor. A second encoder for measures a second position of the second motor and sends a second motor. A second encoder for measures a second position of the second motor and sends a second encoder feedback signal indicating the second position of the second motor. A second encoder feedback signal verification circuit verifies the integrity of the second encoder feedback signal. A system control controls the first and second motor controls.

BRIEF DESCRIPTION OF THE DRAWINGS

The present invention is described below by reference to the following drawings, in which:

FIG. 2b shows a plot of a typical sequence of encoder feedback pulses generated by the encoder of FIG. 1 versus time, generated to correspond with the time of FIG. 2a;

DETAILED DESCRIPTION

Systems using multiple motors to drive processing components of the system control the timing and the speed of the motors so that the components of the system interact properly and effectively. One way to effectuate such interaction is to use encoders to send feedback signals to the system control center informing the control center of the actual positioning of the motors. Systems using encoder feedback for multi-drive applications are negatively impacted if the integrity of the encoder feedback signal is not high. Both system performance and the ability to use drive diagnostic tools may diminish as the integrity of the encoder feedback signal deteriorates. Absence of reliable diagnostic tools often results in excessive servicing or replacement of encoders, cables, and encoder cards.

Figure 1:
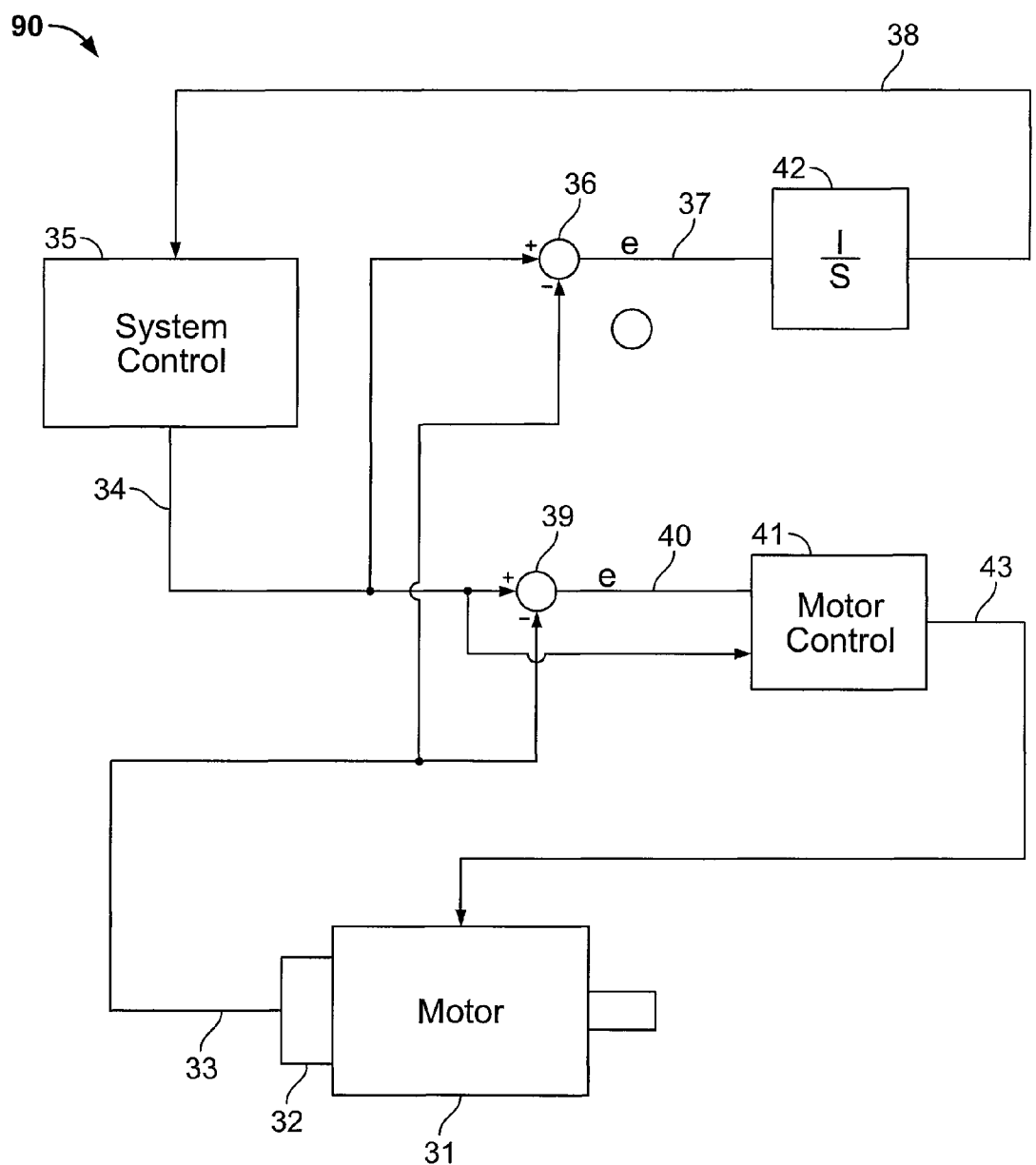
FIG. 1 shows a schematic view of an encoder feedback integrity verification system according to an embodiment of the present invention.

FIG. 1 shows a schematic view an encoder feedback integrity verification system 90 according to an embodiment of the present invention. An encoder 32 is connected to a motor 31. A system control 35 controls the positioning of motor 31 by a command signal 34 to a motor control 41, which controls the positioning of motor 31 by sending a position signal 43 to motor 31. Command signal 34 is also measured by a negative feedback summing junction 39. When motor 1 receives position signal 43 from system control 35, if the system is working perfectly, motor 31 should rotate to a position as commanded by system control 35. Encoder 32 then measures the actual position of motor 31 and sends an encoder feedback signal 33 to a negative feedback summing junction 39. Next, negative feedback summing junction 39 compares signals 33, 34. The difference between signals 33, 34 is determined to be a resulting error 40. A signal indicating resulting error 40 is then sent to motor control 41, which through position signal 43 causes motor 31 to increase or decrease speed based on resulting error 40. This section thus defines a feedback control loop running from motor 31, through encoder 32, feedback signal 33 and summing junction 39 to motor control 41.

The present invention also provides a feedback signal verification circuit or integrity check loop to insure the encoder is functioning properly. A summing junction 36, an integrator 42, and a system control 35 make up a feedback signal verification circuit to check encoder integrity. Encoder feedback signal 33 and command signal 34 can thus also be measured for diagnostic purposes to verify the integrity of encoder feedback signal 33. The actual position of the motor, as indicated by encoder feedback signal 33, is subtracted from the command position, as indicated by command signal 34, in summing junction 36. A resulting error 37, the difference between signals 33, 34, is then transmitted to integrator 42, where error 37 is summed over time. Integrated value 38 is sent back to system control 35, where integrated value 38 can be compared to an expected value. Error 37 alternatively may be taken directly from error 40.

The expected value may be a function of speed and can be determined experimentally or empirically, as will be described herein. Once integrated value 38 and the expected value are compared, an appropriate action message related to the encoder feedback integrity can be generated. An example of a group of error messages are as follows. When there is only a small error between the expected value and integrated value 38, a message can be generated stating "Check feedback components at next scheduled service," when there is a medium error the message can be "Performance may be compromised, check product quality, stop and correct problem if critical components are altered," and when the error is large the message can be "Instability is possible, stop and correct problem."

Figure 2A:
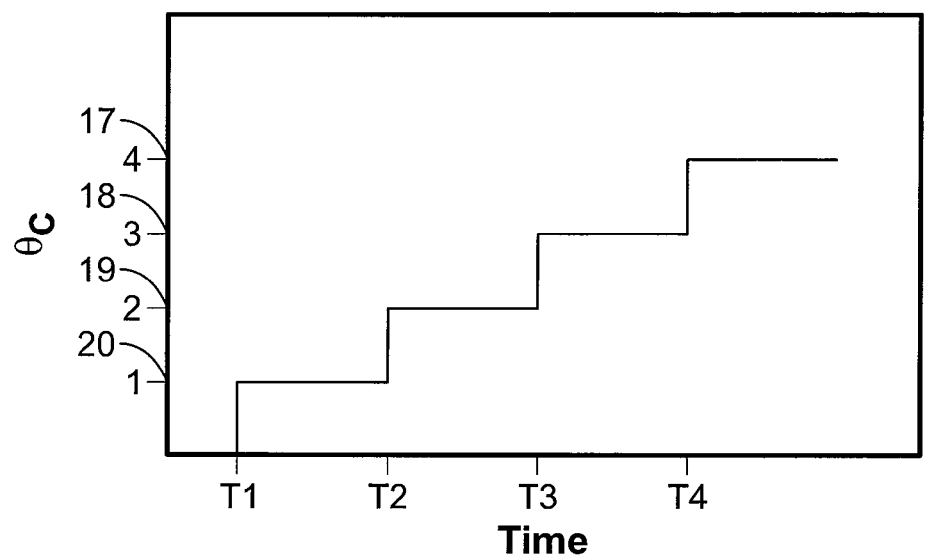
FIG. 2a shows a plot of a position command of the motor of FIG. 1 versus time.
Figure 2B:
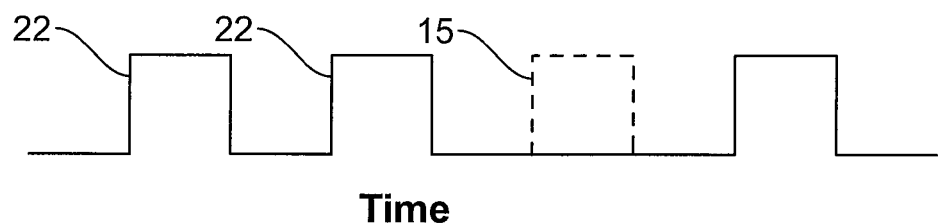
Figure 2C:
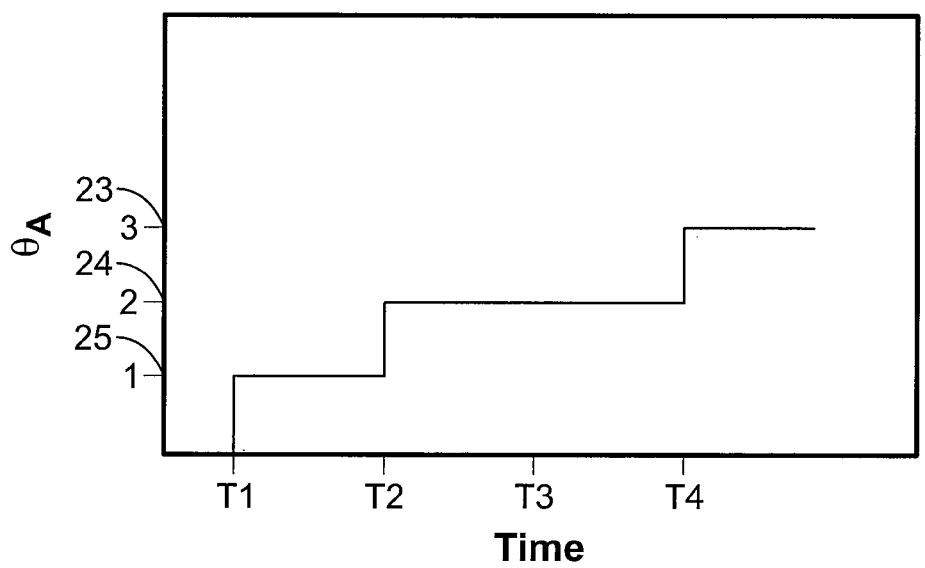
FIG. 2c shows a plot of the position feedback signal generated by the encoder of FIG. 1, or the actual position of the motor, formed from adding the pulses from FIG. 2b together, versus time.

FIGS. 2a, 2b, 2c illustrate a missed encoder pulse during steady state running in the system shown in FIG. 1. FIG. 2a shows a plot of a position command of the motor 31 from FIG. 1 versus time. FIG. 2b shows a plot of a typical sequence of encoder feedback pulses generated by the encoder 32 of FIG. 1 versus time, generated to correspond with the time of FIG. 2a. FIG. 2c shows a plot of the position feedback signal 34 generated by the encoder 32 of FIG. 1, or the actual position of the motor 31, formed from adding the pulses from FIG. 2b together, versus time. Comparing FIG. 2a to FIG. 2c illustrates the difference between the motor position command, sent as command signal 34 (FIG. 1), and the actual position, as indicated by encoder feedback signal 33 (FIG. 1). At time T1 position command 20 and position feedback 25 are equal, so no additional error 40 is integrated in the diagnostics. The same is true for time T2, where position command 19 equals position feedback 24. At time T3 encoder pulse 15 was missing and therefore position feedback value 24 did not increase as desired by system control 35. However, the position command 18 at time T3 did increase, leaving an error 40 (FIG. 1) between the position command and the actual position.

As shown in FIG. 1, error 40 causes motor control 41 to send position signal 43 to increase speed of motor 31 temporarily until error 40 is driven to zero. Just as a missing pulse may generate an error, an inadvertent extra pulse may generate an error. If this occurs, motor control 41 may command motor 31 to slow down until the error has been driven to zero. However, if motor 31 is in the actual position commanded by system control 35 and encoder 32 erroneously sends a signal indicating the incorrect position, motor controller 41 alters the position of motor 31 so the position of motor 31 does not accurately correspond to the position desired by system control 35.

To identify an erroneous encoder feedback signal 33, the difference between command signal 34 and encoder feedback signal 33, error 37, is integrated in the diagnostic integrator 42 to verify the integrity of encoder feedback signal 33, while motor control 41 is correcting the position of motor 31. It may be expected that value 38, corresponding to motor speed, is a constant non-zero value during operation. However, if encoder 32 is working properly and the integrity of encoder feedback signal 33 is adequate, value 38 should remain constant at a steady state speed. Also, value 38 should be near or equal to the expected value for a certain speed. Any deviations in value 38 should signify a problem with encoder 32 and can be reported to the user in a manner corresponding to the amount of deviation. Depending on the size of the deviation, the size of the error can be estimated. The expected value can also be, for example, a function of time during start up or non-steady state running and can be determined empirically, for example, by testing.

The system of the present invention may be particularly useful when used in an offset lithographic printing press. In an offset lithographic printing press a plurality of motors may drive cylinders of printing units. Some type of control system may direct the operation of the motors and therefore the rotation of the cylinders. In an offset lithographic printing press it is important that the rotation of the cylinders in relation to one another is timed so that the cylinders interact properly and effectively. This permits, for example, proper color registration for a four color printing press. The present invention would ensure proper timing of the cylinders and would allow problems to be diagnosed and corrected, thereby ensuring a quality printed product.

Figure 3:
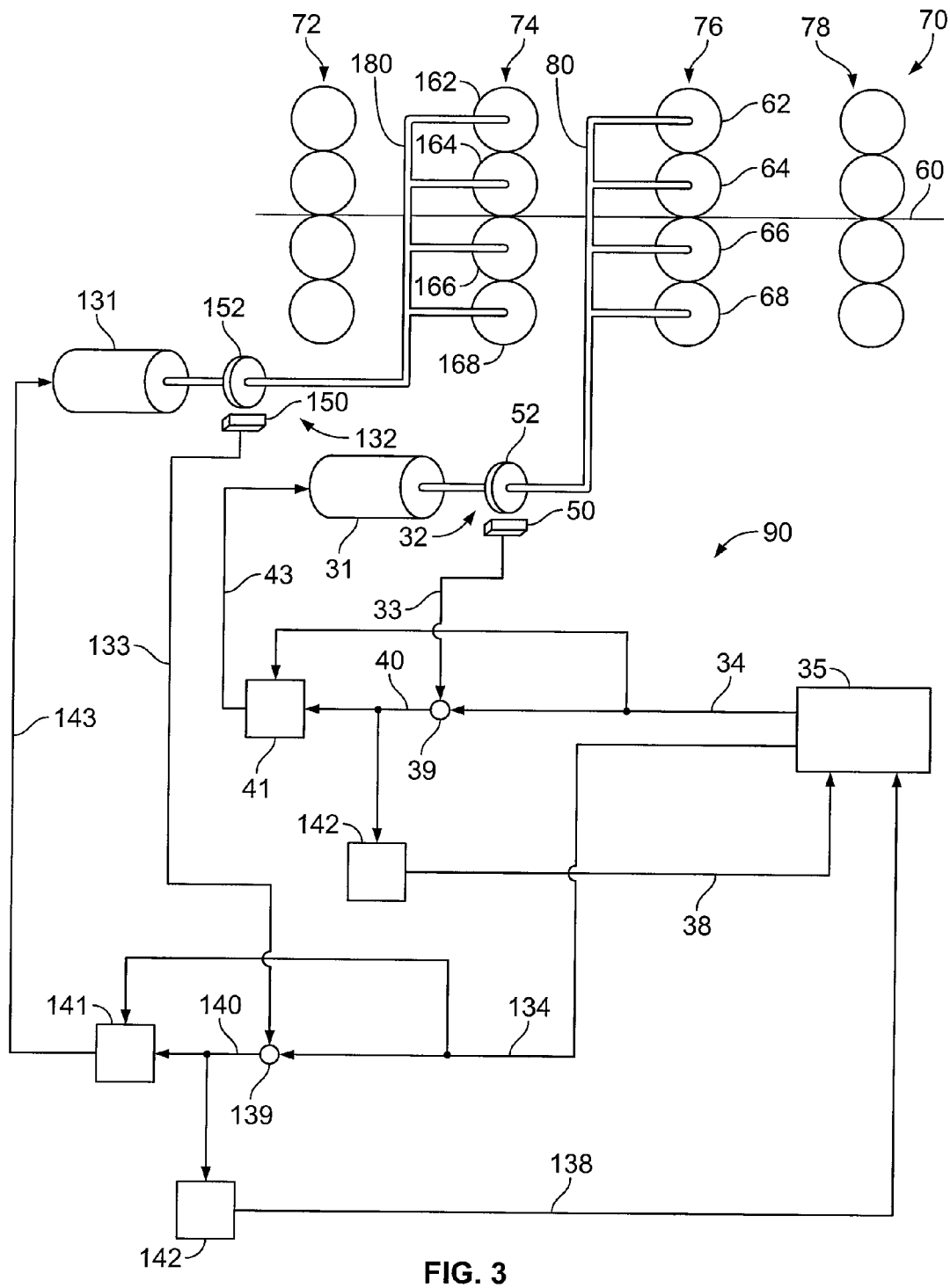
FIG. 3 shows a schematic view of an encoder integrity feedback verification system according to an embodiment of the present invention incorporated into a four color web-offset lithographic printing press.

An example of a multi-drive system is a printing press, wherein the processing components are printing units. FIG. 3 shows a schematic view of an encoder integrity feedback verification system according to an embodiment of the present invention incorporated into a four color web-offset lithographic printing press 70. Printing press 70 includes four printing units 72, 74, 76, 78, each printing unit 72, 74, 76, 78 having the same configuration, but printing a different color on a passing web 60 to form images on the web 60. A first common drive 80 rotates first plate cylinders 62, 68 and first blanket cylinders 64, 66 of a first print unit 76, and a second common drive 180 rotates second plate cylinders 162, 168 and second blanket cylinders 64, 66. A first motor 31 drives first common drive 80 as directed by a first motor control 41, and a second motor 131 drives second common drive 180 as directed by a second motor control 141.

Each motor control 41, 141 receive position commands from a system control 35 via a first command signal 34 and second command signal 134, respectively. A first encoder 32 and a second encoder 132 include encoder disks 52, 152, an encoder sensors 50, 150, respectively. Encoder disks 52, 152 are mounted on common drives 80, 180 and rotate in relation to the position of motors 31, 131, respectively. First encoder sensor 50 measures a first position of first encoder disk 52 and converts the first position into a first encoder feedback signal 33, and second encoder sensor 150 measures a second position of second encoder disk 152 and converts the second position into a second encoder feedback signal 133. Encoder feedback signals 33, 133 are sent to a first negative feedback summing junction 39 and a second negative feedback summing junction 139, respectively. Command signals 34, 134 are sent to respective motor controls 41, 141 and also to respective negative feedback summing junctions 39, 139. Summing junction 39 compares signals 33, 34, while summing junction 139 compares signals 133, 134.

The difference between the values of signals 33, 34, as determined by first summing junction 39, is a first error 40. The difference between the values of signals 133, 134, as determined by second summing junction 39, is a second error 140. A signal indicating first error 40 is then sent to first motor control 41, which causes first motor 31 to increase or decrease speed based on first error 40, to be in the position as commanded by system control 35, via position signal 43. A signal indicating second error 140 is then sent to second motor control 141, which causes second motor 131 to increase or decrease speed based on second error 140, to be in the position as commanded by system control 35, via position signal 143. This system ensures that blanket cylinders 64, 66 of first printing unit 76 and blanket cylinders 164, 166 of second printing unit 176 print on web 60 at the proper time and position in relation to one another. Because the four printing units 72, 74, 76, 78 are timed in relation with one another to produce a desired final image, any positioning errors by the motor may affect the quality of the final printed products produced by printing press 70. Positioning errors may lead to blurring or other deficiencies in the final products, thereby preventing the products from being of sufficient quality to be used for their intended purpose.

To further ensure proper timing and position of print cylinders 62, 64, 66, 68 of printing unit 76, and of print cylinders 162, 164, 166, 168 of printing unit 74, two encoder feedback integrity verification circuits monitor the signals 33, 133 transmitted by encoder sensors 50, 150, respectively, to confirm that encoder sensors 50, 150 are working properly. A first integrity verification circuit of first printing unit 76 includes first summing junction 39, a first integrator 42, and system control 35. A second integrity verification circuit of second printing unit 74 includes summing junction 139, a second integrator 142, and system control 35. Errors 40, 140, determined by respective summing junction 39, 139, are transmitted to respective integrators 42, 142, where errors 40, 140 are integrated over time. Finally, integrated values 38, 138, corresponding to the respective speeds of motors 31, 131, are sent back to system control 35, where integrated values 38, 138 can be compared to respective expected values.

Depending on the difference between integrated value 38 and the corresponding expected value, system 90 may generate a message to inform an operator whether encoder disk 52 and encoder sensor 50 need to be repaired or replaced. The same procedure occurs in regards to integrated value 138, and a message is produced related to encoder disk 152 and encoder sensor 150. A defective encoder disk or encoder sensor may disrupt the speed and positioning of cylinders of printing units 74, 76 and may result in substandard printed products.

Although FIG. 3 only shows two printing units 74, 76 equipped with an encoder feedback integrity verification system 90, proper coordination of printing units 72, 74, 76, 78 with one another may require that at least three or all of the printing units 72, 74, 76, 78 be equipped with an encoder feedback integrity verification system 90. System control 35 may control multiple motors and check the integrity of multiple encoders, or alternatively, an individual system control may be provided for each motor and may communicate with the other system controls to correctly align their corresponding print cylinders for proper operation and check the integrity of their corresponding encoders. Printing units may also have different drive arrangements, with each cylinder being driven by different motor or with two motors, each motor driving a plate and blanket cylinder pair. In such an arrangement an encoder feedback integrity verification circuit may be provided for each motor. In addition to printing presses, the present invention could be used with post-press equipment such as inserters or saddle stitchers, or other multi-drive printing equipment.

Should system control 35 also provide speed signals, the encoder feedback signal verification circuit could also be sent to verify these signals, for example by identifying unaccounted for accelerations.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A multi-drive printed product processing device comprising:
    a processing component;
    a motor driving the processing component;
    a motor control controlling the motor;
    an encoder for measuring a position of the motor and sending an encoder feedback signal indicating the position and the motor control receiving the encoder feedback signal;
    an encoder feedback signal verification circuit verifying the integrity of the feedback signal, the encoder feedback signal verification circuit including an integrator for computing an integrated value as a function of an error representing the difference between a desired position and the position.

2. The multi-drive printed product processing device recited in claim 1 further comprising a system control controlling the motor control, wherein the integrator sends the integrated value to the system control.

3. The multi-drive printed product processing device recited in claim 2 wherein the system control compares the integrated value to an expected value.

4. The multi-drive printed product processing device recited in claim 3 the encoder feedback signal verification circuit further comprising a summing junction to compute the error.

5. The multi-drive printed product processing device as recited in claim 3 wherein the system control generates an error message based on a difference between the integrated value and the expected value.

6. The multi-drive printed product processing device as recited in claim 1 wherein the integrator sums the error over time.

7. A multi-drive printed product processing device comprising:
    a processing component;
    a motor driving the processing component;
    a motor control controlling the motor;

an encoder for measuring a position of the motor and sending an encoder feedback signal indicating the position and the motor control receiving the encoder feedback signal;

an encoder feedback signal verification circuit verifying the integrity of the feedback signal; and a first summing junction, the encoder feedback signal verification circuit including a system controller and a second summing junction, the first summing junction receiving a command signal from the system controller and comparing the command signal with the encoder feedback signal, the second summing junction receiving the command signal from the system controller and comparing the command signal with the encoder feedback signal for diagnostic purposes.

8. The multi-drive printed product processing device as recited in claim 7 wherein a resulting error determined by the first summing junction is sent from the first summing junction to the motor control, the motor control increasing or decreasing the speed of the motor based on the resulting error.

9. The multi-drive printed product processing device as recited in claim 8 wherein the encoder feedback signal verification circuit includes an integrator, the integrator integrating a resulting error determined by the second summing junction to provide an integrated value to the system controller.

* * * * *